(12) United States Patent
Chang (10) Patent No.: US 7,810,540 B2
(45) Date of Patent: Oct. 12, 2010

(54) HAND-HELD ELECTRIC SEALER WITH DUAL HEADS

(76) Inventor: Richard Chang, 4th Fl., No. 276, Sec. 1, Ta Tung Rd., Hsi Chih City, Taipei (TW)

(*) Notice: Subject to any disclaimer, the term of this patent is extended or adjusted under 35 U.S.C. 154(b) by 271 days.

(21) Appl. No.: 12/219,089

(22) Filed: Jul. 16, 2008

(65) Prior Publication Data
US 2009/0020230 A1    Jan. 22, 2009

(30) Foreign Application Priority Data
Jul. 16, 2007   (TW) .............................. 96125847 A
Apr. 11, 2008   (TW) .............................. 97113174 A (51) Int. Cl.
   *B32B 37/00* (2006.01)
(52) U.S. Cl. .................. 156/579; 156/515; 156/530; 156/581; 156/583.1
(58) Field of Classification Search ............... 156/510, 156/515, 530, 579, 580, 581, 583.1, 583.6, 156/583.7, 583.8, 583.9; 219/243
   See application file for complete search history.

(56) References Cited

U.S. PATENT DOCUMENTS

| 6,779,575 B1 * | 8/2004 | Arthun ....................... 156/515 |
| 6,868,889 B2 * | 3/2005 | Kvamme et al. ............ 156/579 |

* cited by examiner

*Primary Examiner*—James Sells
(74) *Attorney, Agent, or Firm*—Bacon & Thomas, PLLC (57) ABSTRACT

A hand-held electric sealer with dual heads includes a seat, a sealing module, a press cover, a supporting casing, and a battery cover. The seat has a central engaging rod and a first replacement element. The sealing module can be attached to, or detached from, the seat. The press cover includes a central engaging piece, a heat insulation block, and a second replacement element. Through engagement of the central engaging piece with the central engaging rod, the press cover can be selectively swung to press the heat insulation block against the sealing module, or to press the second replacement element against the first replacement element. The first replacement element and the second replacement element can be substituted with an appropriate module element upon demand on various functions.

20 Claims, 11 Drawing Sheets

HAND-HELD ELECTRIC SEALER WITH DUAL HEADS

BACKGROUND OF THE INVENTION

1. Field of the Invention

The present invention relates to hand-held electric sealers, and more particularly, to a hand-held electric sealer with dual heads where one of the heads can be a blade module or, alternatively, a sealing module with dual heating wires and the other head can be a detachable sealing module.

2. Description of Related Art

Conventionally, a hand-held electric sealer is provided for sealing plastic packing bags. However, when a previous sealing is necessary to be cut off from the plastic bag (for the purpose of taking out goods packed in the plastic bag), an extra pair of scissors are required. Further, the conventional hand-held electric sealer can only seal the plastic bag with a single sealing score, and this may not be able to sustain sealing a thick plastic bag.

SUMMARY OF THE INVENTION

An object of the present invention is to provide a hand-held electric sealer with dual heads, wherein one of the heads can be a blade module, so that improvement can be made to overcome the inconvenience resulted from a conventional electric sealer where a pair of scissors are necessary in order to cut off a previous sealing from a plastic packing bag.

Another object of the present invention is to provide a hand-held electric sealer with dual heads, wherein one of the heads can be a sealing module with dual heating wires so as to strengthen a sealing made on plastic bags when thick plastic bags are to be sealed.

Still another object of the present invention is to provide a hand-held electric sealer with dual heads, wherein the other head can be a detachable sealing module, so that the sealing module can be attached to, or detached from the sealer conveniently when the sealing module is worn out and that a new one is required.

According to the present invention, the hand-held electric sealer with dual heads comprises a seat, a sealing module, a press cover, a supporting casing, and a battery cover. The seat includes an engaging slot, a front insertion slot, a central engaging rod, a rear insertion slot, and a first replacement element. The front insertion slot is engaged with a front contact, while the rear insertion slot with at least one rear contact. A battery chamber is provided at the backside of the seat for receiving batteries acting as a power source for the sealer with dual heads. A battery cover is provided underneath the seat for enclosing the seat.

In the present invention, the sealing module includes a bottom cover, two contacts, a spring, a heat insulation base, a heating wire, and a top cover. The bottom cover is, at its backside, provided with an engaging part for being engaged with the engaging slot of the seat; as such the bottom cover can be attached to, or detached from, the seat. The bottom cover is also provided, at its rear inside, with two insertion slots for receiving the two contacts which are electrically connected with the front contact. The spring is interposed between the bottom cover and the heat insulation base. The heating wire straddles over the heat insulation base, and the top cover has an opening with the heat insulation base extending therethrough.

The press cover includes a central engaging piece, a heat insulation block, and a second replacement element.

Further, the supporting casing includes an upper support and a lower support, where the upper and lower supports are integrally made as an elastic element, and made of, for instance, rubber. The upper support has an upper front slot, an upper central slot, and an upper rear slot. The heat insulation block is disposed in the upper front slot, the central engaging piece in the upper central slot, and the second replacement element in the upper rear slot. The lower support has a lower front slot, a lower central slot, and a lower rear slot. The top cover of the sealing module is disposed in the lower front slot, the central engaging rod of the seat in the lower central slot, and the first replacement element in the lower rear slot.

The press cover is engaged with and above the upper support, and that the seat and the sealing module, after combination thereof, are entirely engaged with and underneath the lower support.

Alternatively, in modified embodiments of the present invention, the supporting casing includes an upper support, a connecting element, and a lower support, where the upper support, the connecting element, and the lower support are three individual parts. The upper support is provided with an upper front slot, an upper central slot, and an upper rear slot. As such, a heat insulation block is disposed in the upper front slot, a central engaging piece in the upper central slot and in a connecting slot of the connecting element. The lower support is provided with a lower front slot, a lower central slot, and a lower rear slot. The top cover of the sealing module is disposed in the lower front slot, the central engaging rod of the seat in the lower central slot, and the anvil in the lower rear slot. The connecting element is interposed between the upper support and the lower support, with a lower end of the connecting element fastened and secured to the lower central slot of the lower support.

In still other modified embodiments of the present invention, a press cover and an upper support are integrally made in one piece. An elastic connecting element is, at its underside, fastened and secured to the lower central slot of a lower support. Alternatively, a press cover and an upper support are integrally made in one piece, and a lower support and a rigid connecting element are integrally made in one piece.

According to the present invention, through engagement of the central engaging piece with the central engaging rod, the press cover can be selectively swung to press the heat insulation block against the sealing module, or to press the second replacement element against the first replacement element. The first replacement element and the second replacement element can be substituted with an appropriate module element upon demand on various functions. Therefore, in the present invention, not only the sealing module can be attached to, or detached from, the hand-held electric sealer conveniently due to, for instance, worn out and that a new sealing module is required; but also a flexible usage and function can be provided for the electric sealer so as to meet various requirements.

In the present invention, if the first replacement element is an anvil, then correspondingly the second replacement element may be a blade module; or vice versa. The blade module may be made of ceramic, steel, or equivalent materials. Alternatively, if the first replacement element is changed to be a sealing module with dual heating wires, then the second replacement element may be a heat insulation block.

Accordingly, with the present invention, a hand-held electric sealer with dual heads, one of the heads can be altered to be a blade module or a sealing module with dual heating wires, which is then in cooperation with the other head such as a detachable sealing module. According to the present invention, improvement can be made to overcome the inconvenience resulted from a conventional electric sealer where a pair of scissors are necessary in order to cut off a previous sealing from a plastic packing bag. Alternatively, a sealing module with dual heating wires can be used so as to strengthen a sealing made on plastic bags when thick plastic bags are to be sealed.

DETAILED DESCRIPTION OF THE PREFERRED EMBODIMENTS

Figure 1:
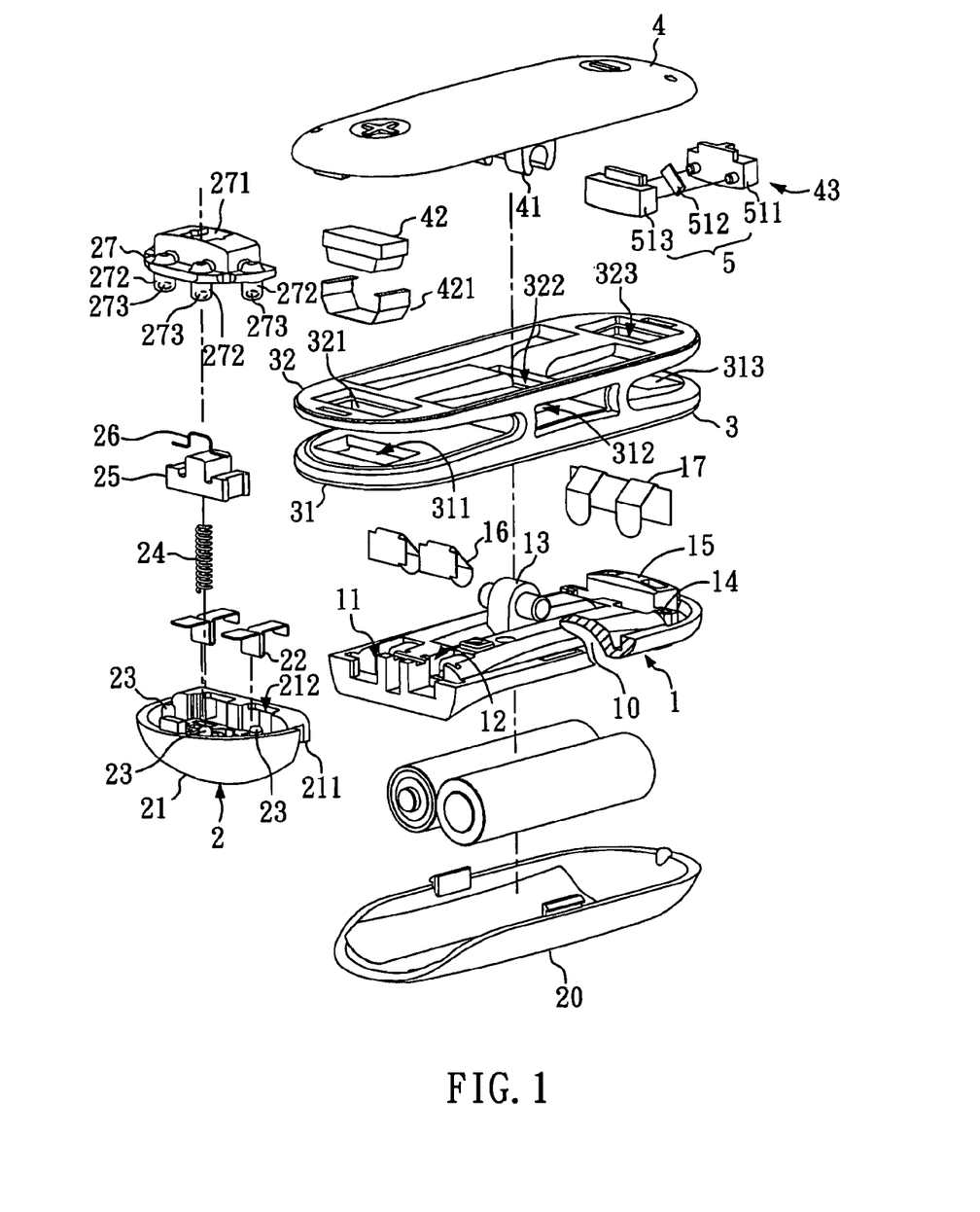
FIG. 1 shows an exploded view of a hand-held electric sealer with dual heads according to a first embodiment of the present invention.

Referring to FIG. 1, a hand-held electric sealer with dual heads according to a first embodiment of the present invention, comprises a seat 1, a sealing module 2, a press cover 4, a supporting casing 3, and a battery cover 20. The seat 1 includes an engaging slot 11, a front insertion slot 12, a central engaging rod 13, a rear insertion slot 14, and a first replacement element 15 (such as an anvil). The front insertion slot 12 is engaged with a front contact 16, while the rear insertion slot 14 with a rear contact 17. A battery chamber 10 is provided at the backside of the seat 1 for receiving batteries acting as a power source for the sealer with dual heads. A battery cover 20 is provided underneath the seat 1 for enclosing the seat 1.

The sealing module 2 includes a bottom cover 21, two contacts 22, a spring 24, a heat insulation base 25, a heating wire 26, and a top cover 27. The bottom cover 21 is, at its backside, provided with an engaging part 211 for being engaged with the engaging slot 11 of the seat 1, as such the bottom cover 21 can be attached to, or detached from, the seat 1. The bottom cover 21 is provided with three fastening pillars 23 extending upward therefrom, and also provided at its rear inside, with two insertion slots 212 for receiving the two contacts 22 which are electrically connected with the front dual contact 16. The spring 24 is interposed between the bottom cover 21 and the heat insulation base 25. The heating wire 26 straddles over the heat insulation base 25, and the top cover 27 has an opening 271 with the heat insulation base 25 extending therethrough. Further, the top cover 27 has three protrusions 272 extending thereunder, where the protrusions 272 are each provided with an engaging hole 273 corresponding to each of the fastening pillars 23. Thereafter, the top cover 27 is engaged with the bottom cover 21 in a manner that the three fastening pillars 23 of the bottom cover 21 are inserted into the three engaging holes 273 of the top cover 27.

Figure 2:
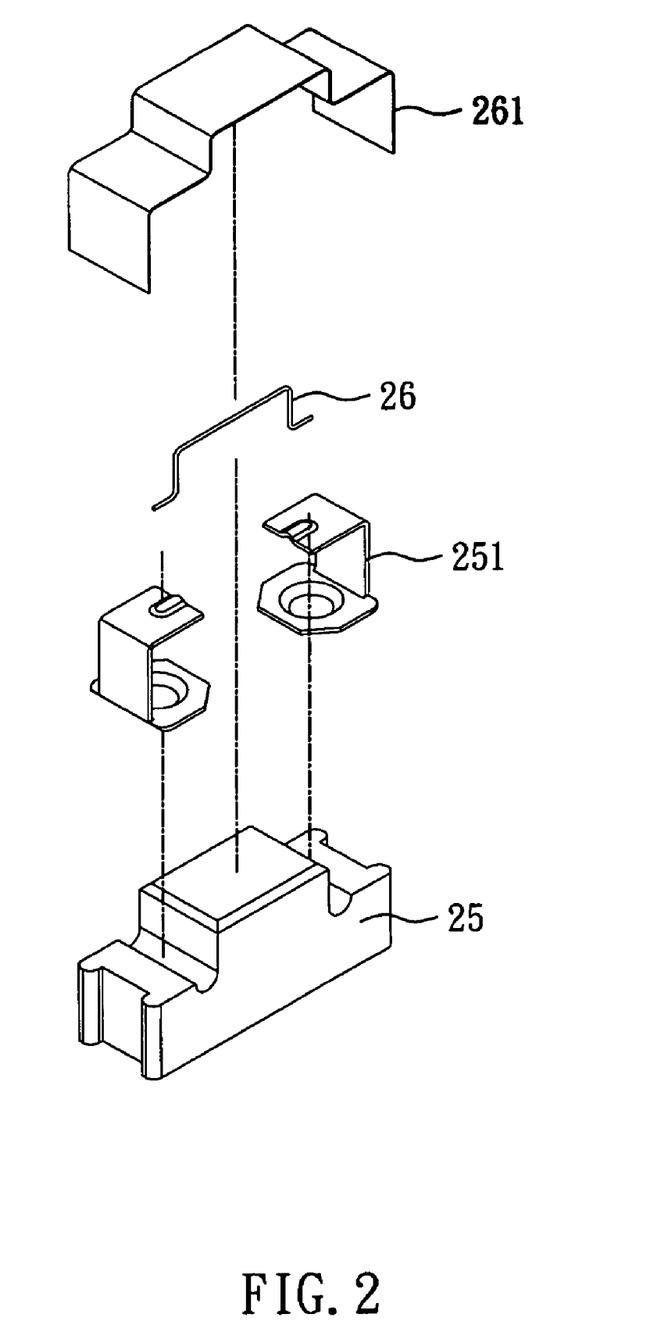
FIG. 2 shows an exploded view of part of a sealing module according to the first embodiment of the present invention.

Now referring to FIG. 2, an explosion view of part of the sealing module according to the first embodiment of the present invention, the sealing module 2 further includes a heat resistant cover sheet 261 and two locating plates 251. The locating plates 251 are made of metal, for not only positioning the heating wire 26, but also for conducting the power source from the battery chamber 10 so as to seal plastic bags. The heat resistant cover sheet 261 is covered on the heat insulation base 25.

The press cover 4 includes a central engaging piece 41, a heat insulation block 42, and a second replacement element 43, with a heat resistant cover sheet 421 covered over the heat insulation block 42 from underneath thereof.

The supporting casing 3 includes an upper support 32 and a lower support 31, where the upper and lower supports 32, 31 are integrally made as an elastic element, and made of, for instance, rubber. The upper support 32 has an upper front slot 321, an upper central slot 322, and an upper rear slot 323. The heat insulation block 42 is disposed in the upper front slot 321, the central engaging piece 41 in the upper central slot 322, and the second replacement element 43 in the upper rear slot 323.

The lower support 31 has a lower front slot 311, a lower central slot 312, and a lower rear slot 313. The top cover 27 of the sealing module 2 is disposed in the lower front slot 311, the central engaging rod 13 of the seat 1 in the lower central slot 312, and the first replacement element 15 in the lower rear slot 313. As such, the press cover 4 can be entirely engaged with and above the upper support 32, while the seat 1 and the sealing module 2, after combination thereof, can be entirely engaged with and underneath the lower support 31.

Through engagement of the central engaging piece 41 with the central engaging rod 13, the press cover 4 can be selectively swung to press the heat insulation block 42 against the sealing module 2, or to press the second replacement element 43 against the first replacement element 15. The first replacement element 15 and the second replacement element 43 can be substituted with an appropriate module element upon demand on various functions. Therefore, in the present invention, not only the sealing module 2 can be attached to, or detached from, the hand-held electric sealer conveniently due to, for instance, worn out and that a new sealing module is required; but also a flexible usage and function can be provided for the electric sealer so as to meet various requirements.

Figure 3:
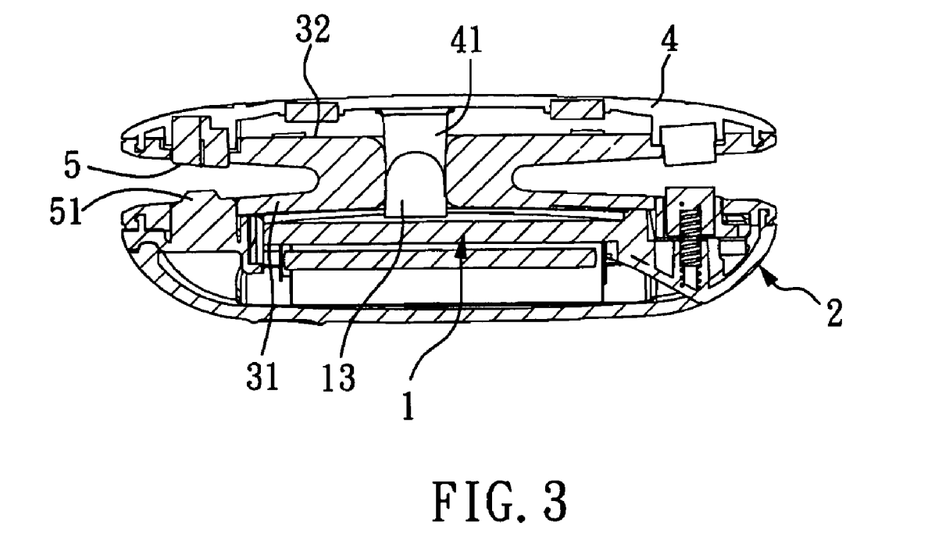
FIG. 3 shows a cross-sectional view of the hand-held electric sealer with dual heads according to the first embodiment of the present invention.
Figure 4:
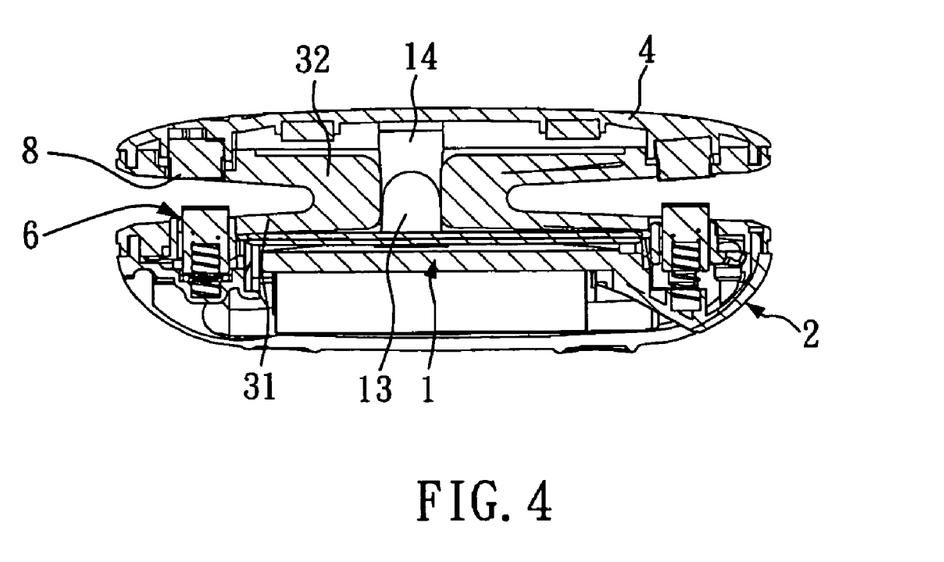
FIG. 4 shows a cross-sectional view of the hand-held electric sealer with dual heads according to a second embodiment of the present invention.

Further, references are made to FIGS. 3 and 4, cross-sectional views of the hand-held electric sealers with dual heads according to the first and second embodiments of the present invention, where details are given on substitution of the first and second replacement elements 15, 43.

Suppose a user needs to change over the replacement elements to ones having a function of seal cutting, then the first replacement element 15 should be changed to an anvil 51, and correspondingly the second replacement element 43 to a blade module 5. The blade module 5 includes a first combination piece 511, a blade 512, and a second combination piece 513, where the blade 512 is interposed between the first and the second combination pieces 511, 513, such that a previous sealing can be cut off.

Alternatively, if an option is made to change the replacement elements to ones for enhancing sealing strength or for sealing thicker plastic bags, then the first replacement element 15 can be changed to a sealing module 6 with dual heating wires and that the second replacement element to a heat insulation block 8.

Accordingly, with the present invention, a hand-held electric sealer with dual heads, one of the heads can be altered to be a blade module or a sealing module with dual heating wires, which is then in cooperation with the other head such as a detachable sealing module. According to the present invention, improvement can be made to overcome the inconvenience resulted from a conventional electric sealer where a pair of scissors are necessary in order to cut off a previous sealing from a plastic packing bag. Alternatively, a sealing module with dual heating wires can be used so as to strengthen a sealing made on plastic bags when thick plastic bags are to be sealed.

Figure 5:
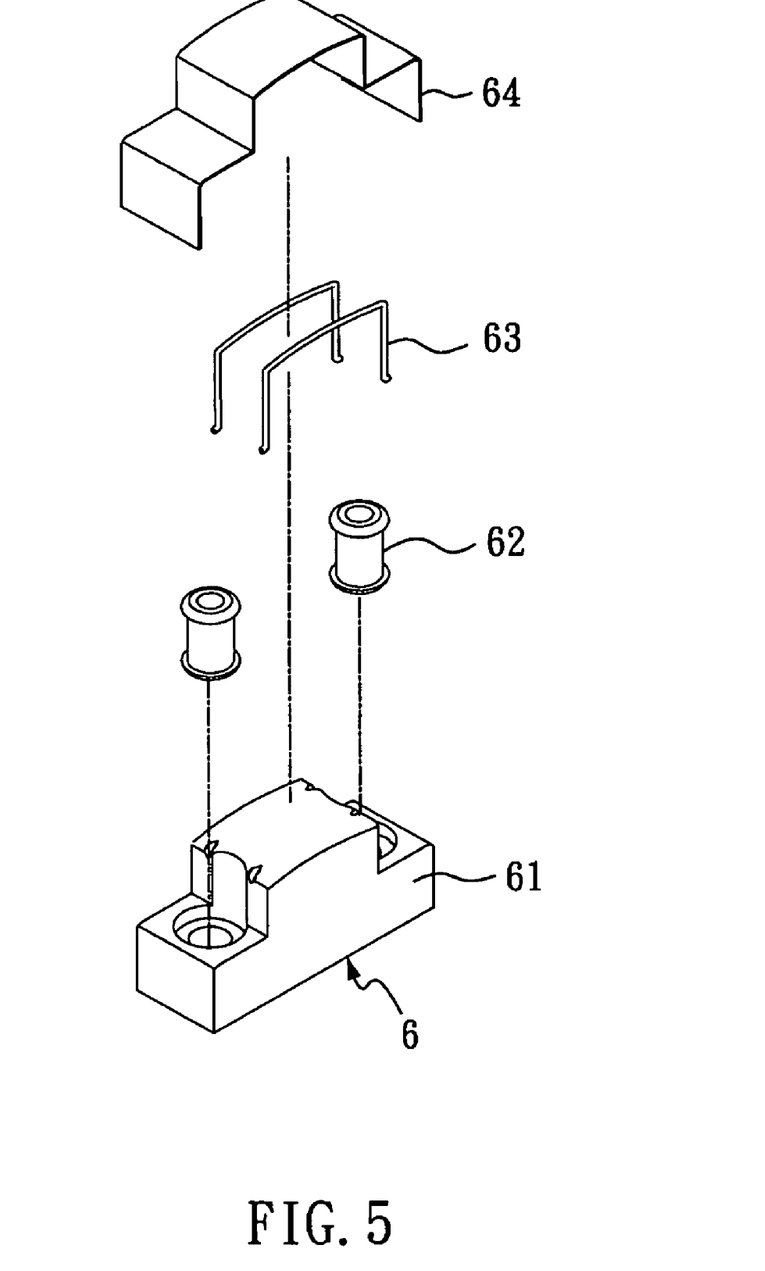
FIG. 5 shows an exploded view of part of a sealing module according to the second embodiment of the present invention.

Further, referring to FIG. 5, an exploded view of part of a sealing module according to the second embodiment of the present invention, the sealing module 6 with dual heating wires 63 includes a heat resistant cover sheet 64 and two locating elements 62, where the heat resistant cover sheet 64 is covered on a heat insulation base 61 and the two locating elements 62 are used to position the dual heating wires 63.

Figure 6:
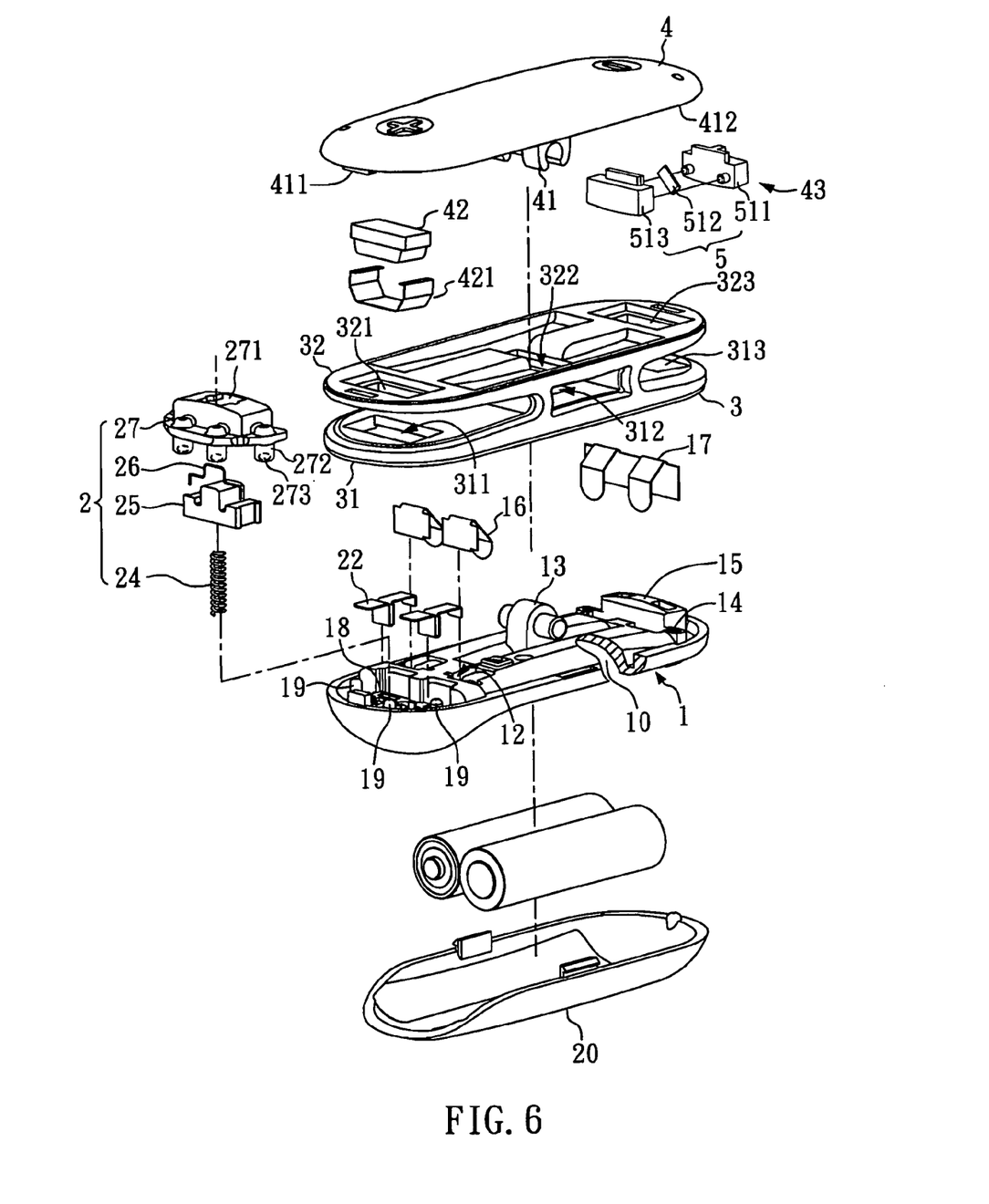
FIG. 6 shows an exploded view of a hand-held electric sealer with dual heads according to a third embodiment of the present invention.

Still further, as shown in FIG. 6, an exploded view of a hand-held electric sealer with dual heads according to a third embodiment of the present invention, the third embodiment owns a structure similar to that of the first embodiment, except that the seat 1 and the bottom cover 21 of the sealing module 2 are molded in one piece by, for instance, plastic injection, unlike the first embodiment where the seat 1 and the bottom cover 21 of the sealing module 2 are separated from each other. Therefore, in this third embodiment, excluding the bottom cover 21, the sealing module 2 only includes the two contacts 22, the spring 24, the heat insulation base 25, the heating wire 26, and the top cover 27. In other words, unlike the first embodiment where the sealing module 2 is engaged with the seat 1 through engagement of the engaging part 211 with the engaging slot 11, in this third embodiment, the sealing module 2 is engaged with the seat 1 in such a manner that three fastening pillars 19 of the seat 1 are inserted into the three engaging holes 273 of the three protrusions of the top cover 27.

As mentioned above, the supporting casing 3, which includes the upper support 32 and the lower support 31, is a one-piece molding elastic element, allowing the press cover 4 to be selectively swung, acting like a seesaw, to press the heat insulation block 42 against the sealing module 2, or to press the second replacement element 43 against the first replacement element 15. Similarly, the one-piece supporting casing 3 can be separated into plural parts, as described in the following, while still maintaining its original function.

Figure 7:
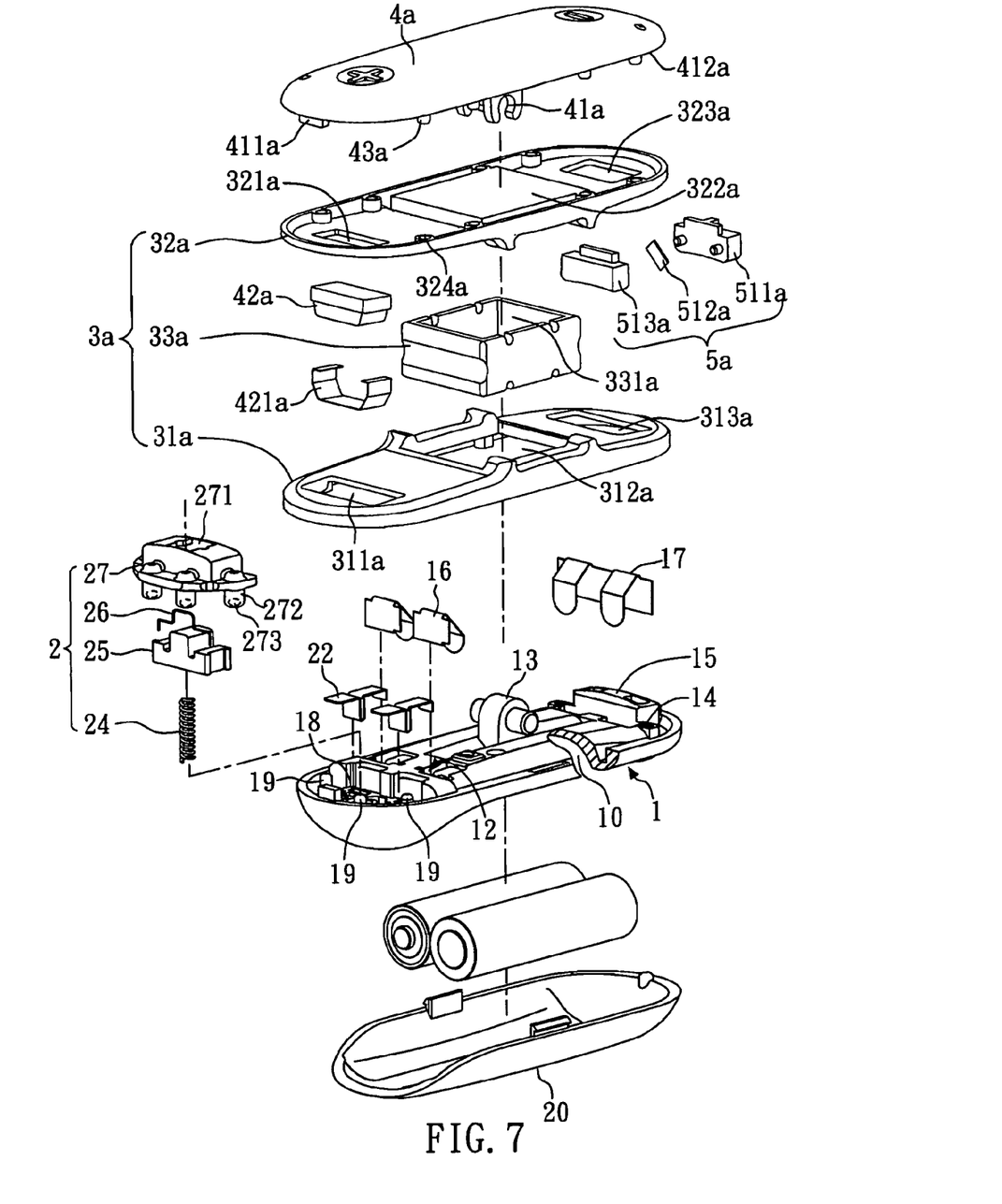
FIG. 7 shows an exploded view of a hand-held electric sealer with dual heads according to a fourth embodiment of the present invention.

Referring to FIG. 7, an exploded view showing a hand-held electric sealer with dual heads according to a fourth embodiment of the present invention, a separated supporting casing 3a includes an upper support 32a, a connecting element 33a, and a lower support 31a, where the upper support 32a, the connecting element 33a, and the lower support 31a are three individual parts; and where the upper support 32a and the lower support 31a are made of rigid material such as injection molding plastic, and the connecting element 33a made of elastic material, such as rubber. Therefore, the supporting casing 3a can act as a seesaw through the elasticity of the connecting element 33a.

The upper support 32a is provided with an upper front slot 321a, an upper central slot 322a, and an upper rear slot 323a. As such, a heat insulation block 42a is disposed in the upper front slot 321a, a central engaging piece 41a is in the upper central slot 322a and as well in a connecting slot 331a of the connecting element 33a. Further, a blade module 5a is disposed in the upper rear slot 323a, where the blade module 5a includes a first combination piece 511a, a blade 512a, and a second combination piece 513a, and the blade 512a is interposed between the first and the second combination pieces 511a, 513a.

The anvil 15 (first replacement element) and the blade module 5a (second replacement element) are oppositely positioned, so that the blade 512a can be pressed against the anvil 15 for cutting off a previous sealing. In other words, in practice, positions of the blade module 5a and the anvil 15 can be exchanged with each other, without affecting the function of the present invention.

Further, the lower support 31a is provided with a lower front slot 311a, a lower central slot 312a, and a lower rear slot 313a. The top cover 27 of the sealing module 2 is disposed in the lower front slot 311a, the central engaging rod 13 of the seat 1 in the lower central slot 312a, and the anvil 15 in the lower rear slot 313a.

The connecting element 33a is interposed between the upper support 32a and the lower support 31a, with a lower end of the connecting element 33a fastened and secured to the lower central slot 312a of the lower support 31a.

A press cover 4a is provided, underneath along its edge, with a plurality of engaging protrusions 43a for being engaged with plural engaging holes 324a provided around top of the upper support 32a, such that the press cover 4a can be fixed to the supporting casing 3a. A central engaging piece 41a of the press cover 4a is disposed in the upper support 32a and in the connecting element 33a; whereas the central engaging rod 13 of the seat 1, the anvil 15 of the seat 1 and the sealing module 2 are disposed in the lower support 31a.

Through engagement of the central engaging piece 41a with the central engaging rod 13, the press cover 4a can be selectively swung to press the heat insulation block 42a against the sealing module 2, or to press the blade module 5a against the anvil 15. As such, a plastic packing bag previously sealed can be cut off by the blade 512a, and after refilling articles into the plastic bag, the sealing module 2 can be employed to re-seal the plastic bag. Therefore, the same plastic bag can be repeatedly used and that the purpose of environmental protection can be achieved.

In the present invention, the press cover 4a, the upper support 32a, the lower support 31a, and the connecting element 33a are all made, separately, piece by piece, which are then combined together. Nevertheless, the following are exemplified embodiments with modifications only made on the press cover 4a and the supporting casing 3a, as based on the fourth embodiment shown in FIG. 7, without change to the functions.

Figure 8:
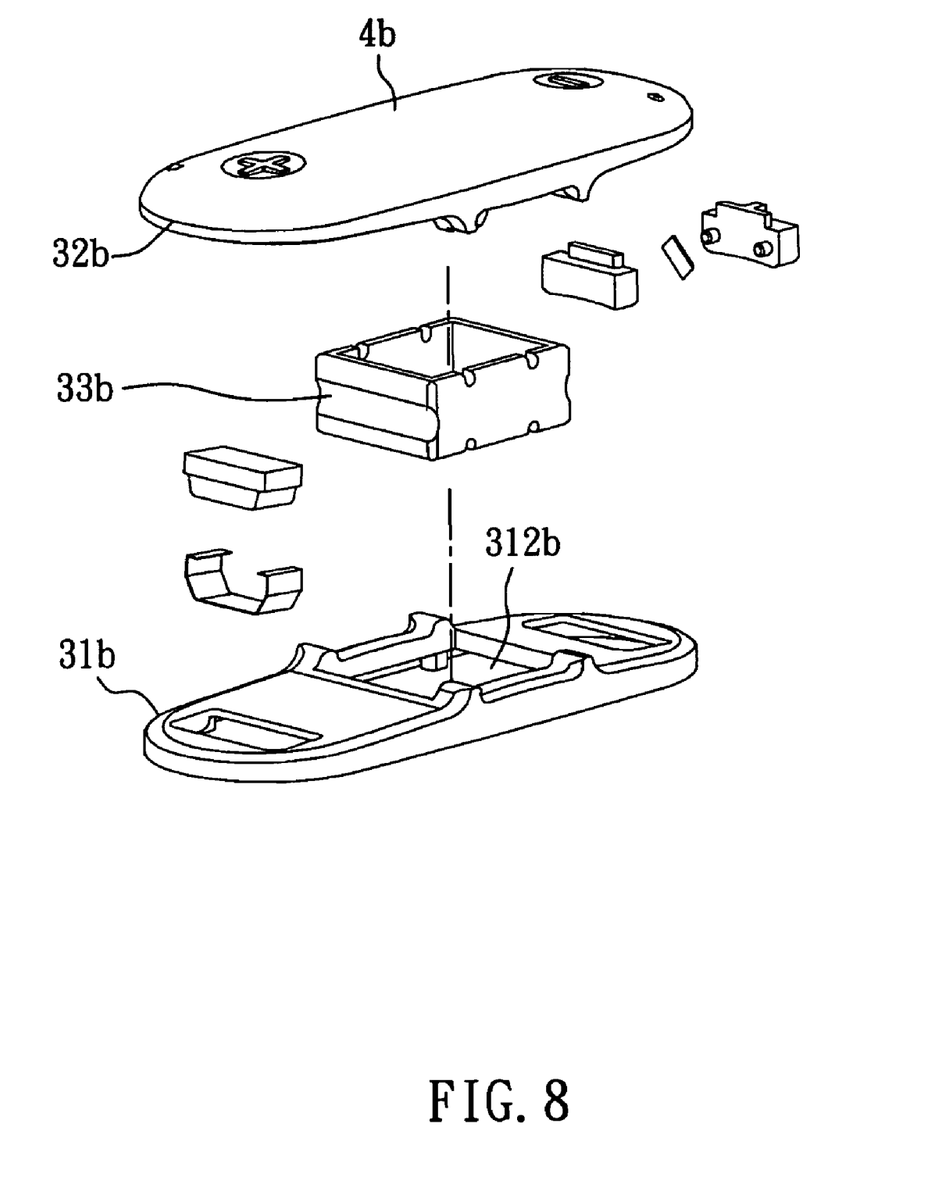
FIG. 8 shows an exploded view of a press cover and a supporting casing according to a fifth embodiment of the present invention.

Referring to FIG. 8, an exploded view of a press cover and a supporting casing according to a fifth embodiment of the present invention, a press cover 4b and a rigid upper support 32b are integrally made in one piece. An elastic connecting element 33b is, at its underside, fastened and secured to the lower central slot 312b of a rigid lower support 31b.

Figure 9:
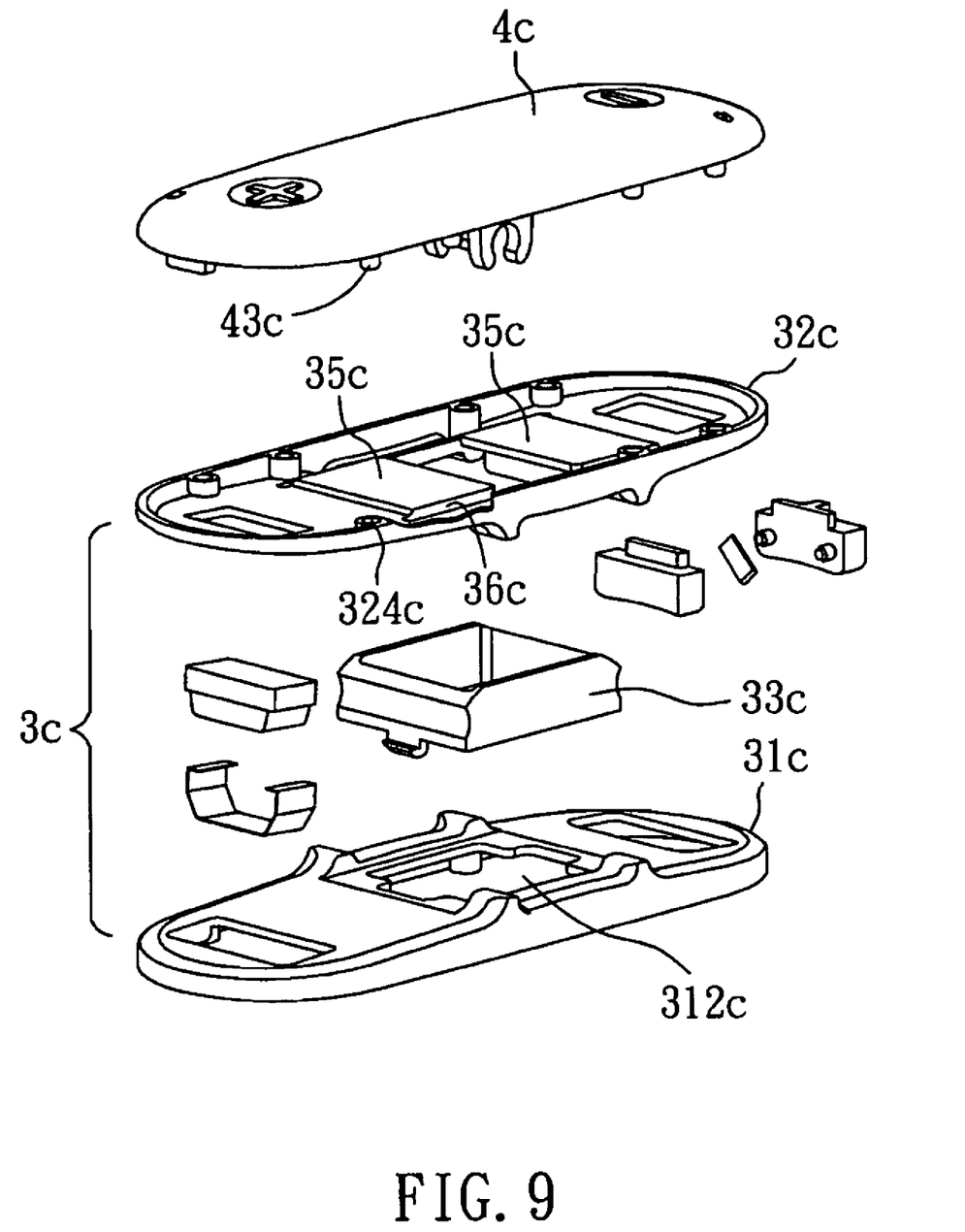
FIG. 9 shows an exploded view of a press cover and a supporting casing according to a sixth embodiment of the present invention.

Now referring to FIG. 9, a sixth embodiment of the present invention, a press cover 4c, an upper support 32c, a lower support 31c, and a connecting element 33c are separately made from one another, like the fourth embodiment mentioned above, though the upper support 32c, the lower support 31c, and the connecting element 33c are all rigid and made of rigid material such as plastic. The connecting element 33c is, at its underside, fastened and secured to the lower central slot 312c of a lower support 31c. A press cover 4c is provided, underneath along its edge, with a plurality of engaging protrusions 43c for being engaged with plural engaging holes 324c provided around top of the upper support 32c.

Given that the upper support 32c, the lower support 31c, and the connecting element 33c are all rigid, in order to maintain the supporting casing 3c a seesaw action, it is preferably to provide the upper support 32c with a pair of elastic sheets 35c by having slots 36c arranged along longitudinal sides of the elastic sheets 35c. Specifically, the paired elastic sheets 35c are extended longitudinally along the upper support 32c and are located above the connecting element 33c. Therefore, when a press cover 4c is pressed down at one end, one of the elastic sheets 35c will be biased downward together with corresponding upper support 32c and connecting element 33c.

Figure 10:
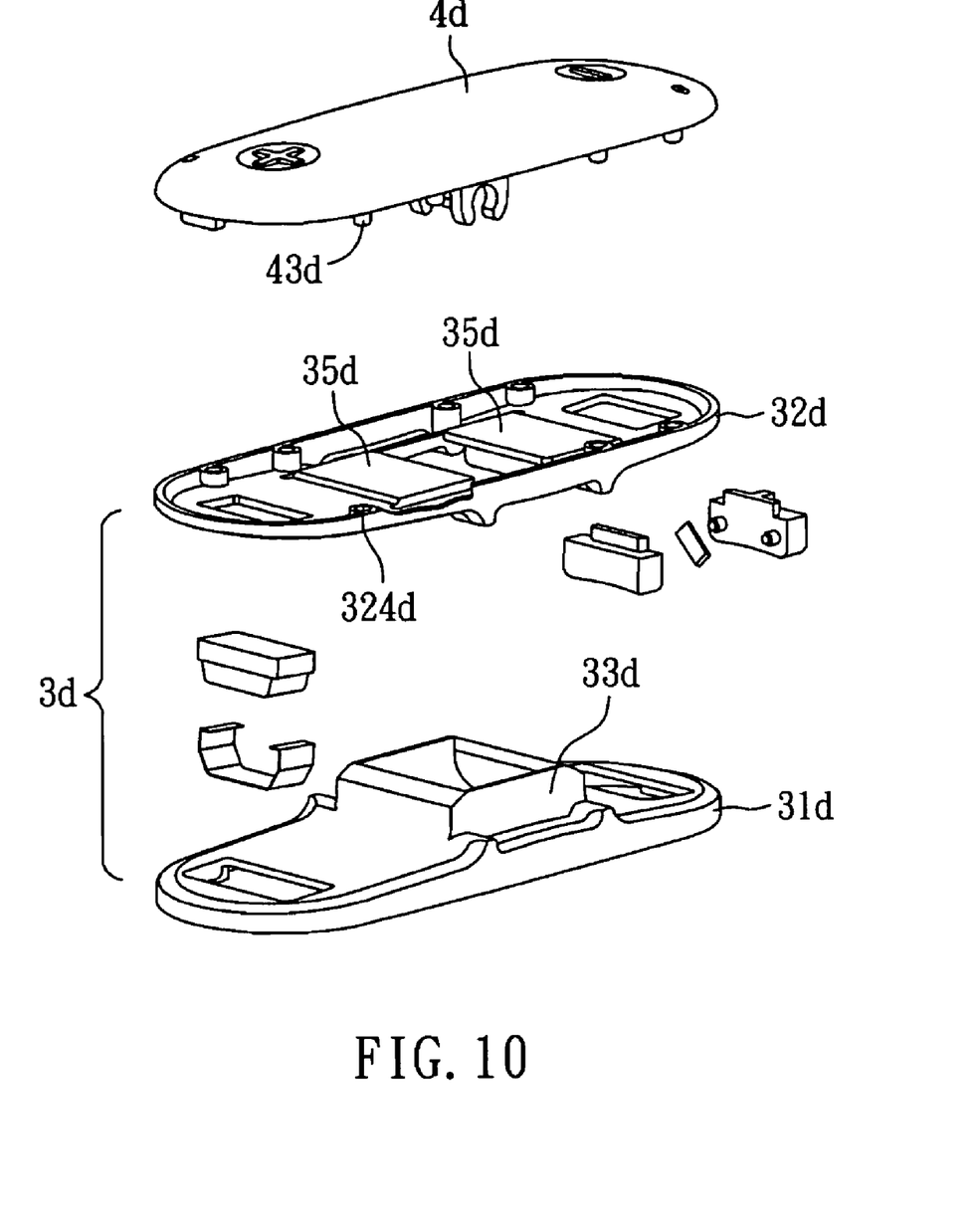
FIG. 10 shows an exploded view of a press cover and a supporting casing according to a seventh embodiment of the present invention.

As shown in FIG. 10, a seventh embodiment of the present invention, in a supporting casing 3d, a rigid lower support 31d and a rigid connecting element 33d are integrally made in one piece. Likewise, the press cover 4d is provided, underneath along its edge, with a plurality of engaging protrusions 43d for being engaged with plural engaging holes 324d provided around top of an upper support 32d. Similarly, because the upper support 32d, the lower support 31d, and the connecting element 33d are all made of rigid material, paired elastic sheets 35d, as mentioned above, are necessary so as to maintain the supporting casing 3d a seesaw action.

Figure 11:
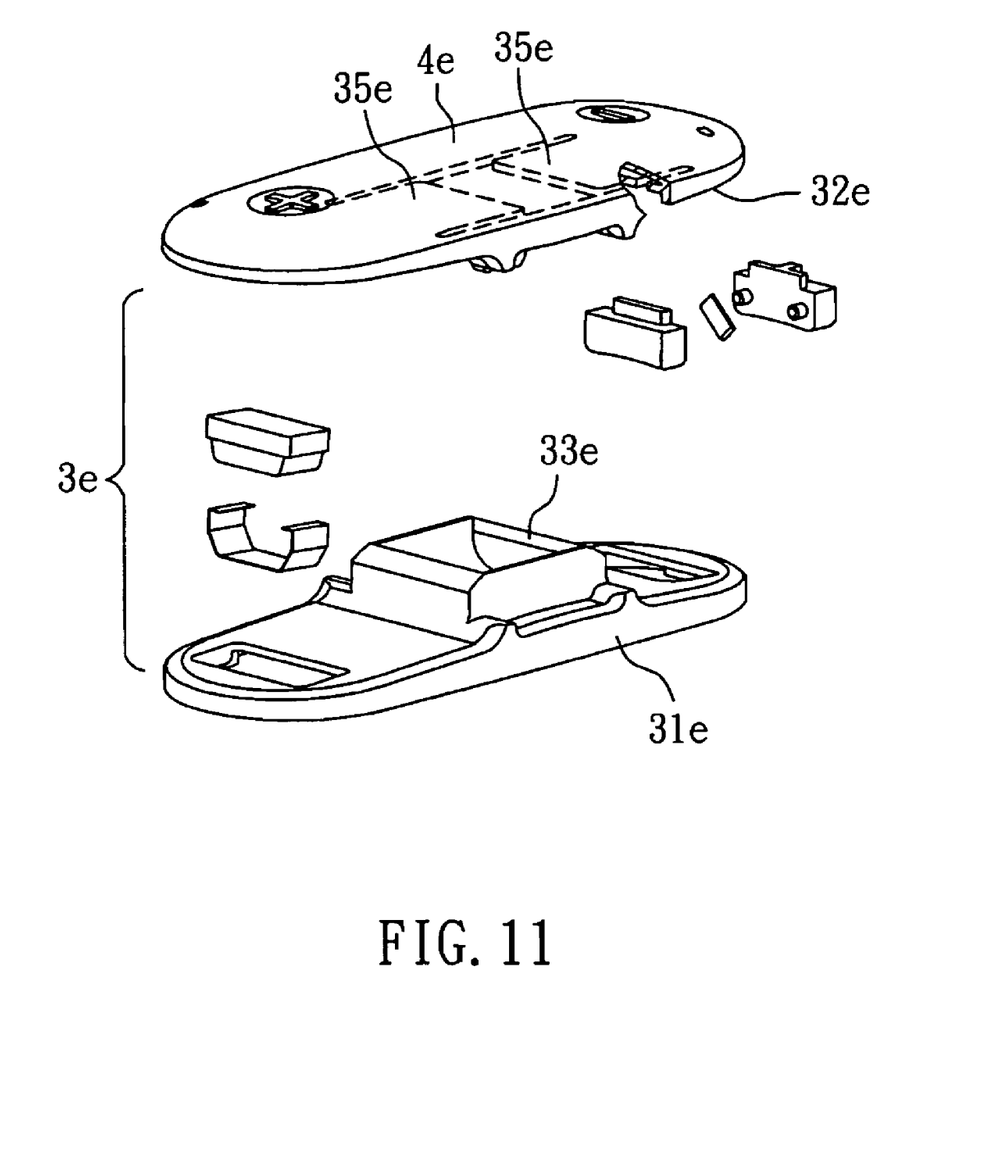
FIG. 11 shows an exploded view of a press cover and a supporting casing according to an eighth embodiment of the present invention.

Further, referring to FIG. 11, an eighth embodiment of the present invention, a rigid press cover 4e and a rigid upper support 32e are integrally made in one piece. And similarly, a rigid lower support 31e and a rigid connecting element 33e are integrally made in one piece.

In this embodiment, since the upper support 32e, the lower support 31e and the connecting element 33e are all made of rigid material, in order to maintain a seesaw action for a supporting casing 3e, paired elastic sheets 35e are necessary so as to maintain the supporting casing 3e a seesaw action.

Figure 12:
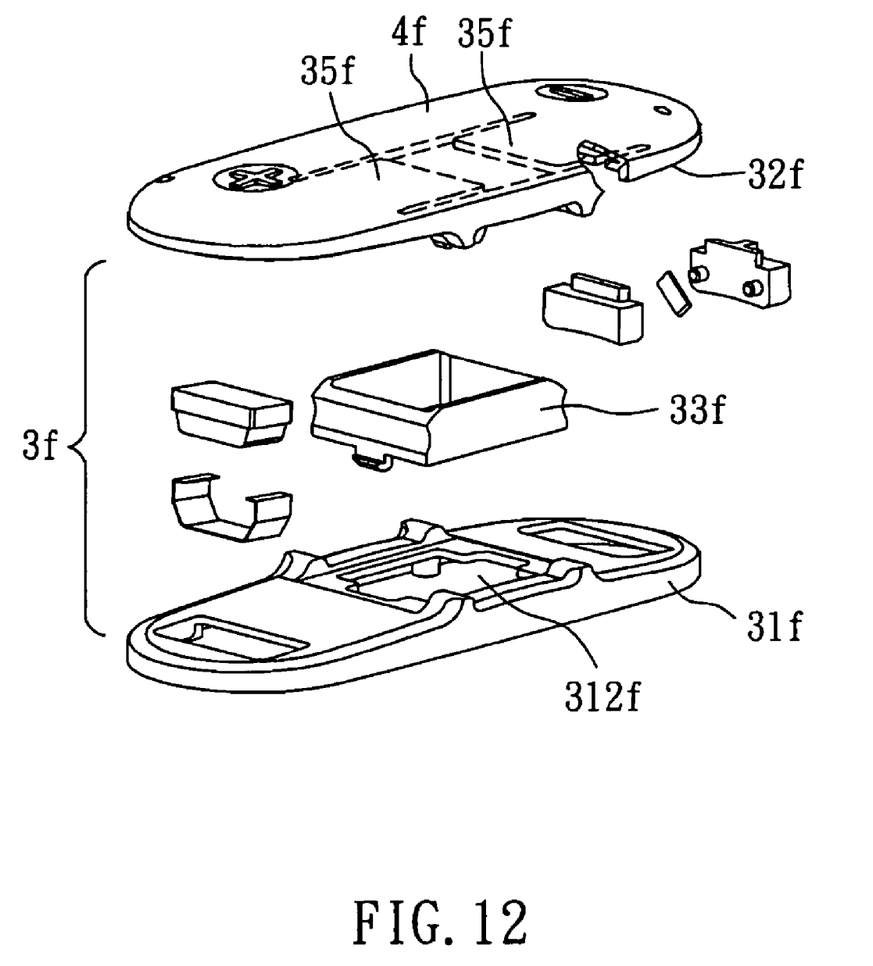
FIG. 12 shows an exploded view of a press cover and a supporting casing according to a ninth embodiment of the present invention.

Now referring to FIG. 12, a ninth embodiment of the present invention, a rigid press cover 4f and a rigid upper support 32f are integrally made in one piece. And a rigid connecting element 33f is, at its underside, fastened and secured to the lower central slot 312f of a lower support 31f.

Again, since the upper support 32f, the lower support 31f, and the connecting element 33f are all made of rigid material, paired elastic sheets 35f, as mentioned above, are necessary so as to maintain a seesaw action for a supporting casing 3f.

Although the present invention has been explained in relation to its preferred embodiments, it is to be understood that many other possible modifications and variations can be made without departing from the scope of the invention as hereinafter claimed.

What is claimed is:

1. A hand-held electric sealer with dual heads, comprising:
   a seat, including an engaging slot, a front insertion slot, a central engaging rod, a rear insertion slot, and a first replacement element;
   a sealing module, including an engaging part for being engaged with the engaging slot of the seat;
   a press cover, including a central engaging piece, a heat insulation block, and a second replacement element; and
   a supporting casing, including an upper support and a lower support, wherein the press cover is engaged with and above the upper support, and the seat and the sealing module are engaged with and underneath the lower support,
   whereby through engagement of the central engaging piece of the press cover with the central engaging rod of the seat, passing through the upper and lower supports of the supporting casing, the press cover can be selectively swung to press the heat insulation block against the sealing module, or to press the second replacement element of the press cover against the first replacement element of the seat.

2. The hand-held electric sealer with dual heads as claimed in claim 1, wherein the first replacement element is an anvil and the second replacement element is a blade module.

3. The hand-held electric sealer with dual heads as claimed in claim 1, wherein the first replacement element is another sealing module and the second replacement element is another heat insulation block.

4. The hand-held electric sealer with dual heads as claimed in claim 1, wherein the sealing module further includes a bottom cover, two contacts, a spring, a heat insulation base, at least one heating wire, and a top cover, and wherein the bottom cover is provided with two insertion slots for receiving the two contacts, and the spring is interposed between the bottom cover and the heat insulation base, the at least one heating wire straddles over the heat insulation base, and the top cover has an opening with the heat insulation base extending therethrough.

5. The hand-held electric sealer with dual heads as claimed in claim 1, wherein the upper support includes an upper front slot, an upper central slot, and an upper rear slot; and wherein the heat insulation block is disposed in the upper front slot, the central engaging piece in the upper central slot, and the second replacement element in the upper rear slot.

6. The hand-held electric sealer with dual heads as claimed in claim 4, wherein the lower support includes a lower front slot, a lower central slot, and a lower rear slot; and wherein the top cover of the sealing module is disposed in the lower front slot, the central engaging rod of the seat in the lower central slot, and the first replacement element in the lower rear slot.

7. The hand-held electric sealer with dual heads as claimed in claim 1, wherein a heat resistant cover sheet is covered on the heat insulation block from underneath thereof.

8. The hand-held electric sealer with dual heads as claimed in claim 2, wherein the blade module includes a first combination piece, a blade, and a second combination piece, and the blade is interposed between the first and the second combination pieces.

9. The hand-held electric sealer with dual heads as claimed in claim 4, wherein the sealing module further includes a heat resistant cover sheet and two locating plates, the heat resistant cover sheet is covered on the heat insulation base, and the two locating plates are provided for positioning the at least one heating wire.

10. The hand-held electric sealer with dual heads as claimed in claim 1, wherein the seat further includes a battery cover and a power source, and the battery cover is provided underneath the seat for enclosing the seat.

11. The hand-held electric sealer with dual heads as claimed in claim 1, wherein the supporting casing is elastic.

12. The hand-held electric sealer with dual heads as claimed in claim 3, wherein the another sealing module includes a heat resistant cover sheet and two locating elements, and the heat resistant cover sheet is covered on a heat insulation base and the two locating elements are used to position dual heating wires.

13. The hand-held electric sealer with dual heads as claimed in claim 1, wherein the supporting casing, including an upper support, a lower support, and a connecting element interposed between the upper support and the lower support, is made by rigid materials.

14. The hand-held electric sealer with dual heads as claimed in claim 13, wherein the upper support is provided with a pair of elastic sheets, and are located above the connecting element, and wherein the press cover is engaged with and above the upper support, and the seat is engaged with and underneath the lower support.

15. A hand-held electric sealer with dual heads, comprising:
- a seat, including fastening pillars, a front insertion slot, a central engaging rod, a rear insertion slot, and a first replacement element;
- a sealing module, including engaging holes for being engaged with the fastening pillars of the seat;
- a press cover, including a central engaging piece, a heat insulation block, and a second replacement element; and
- a supporting casing, including an upper support, a lower support, wherein the press cover is engaged with and above the upper support, and the seat is engaged with and underneath the lower support,
- whereby through engagement of the central engaging piece of the press cover with the central engaging rod of the seat, passing through the upper and lower supports of the supporting casing, the press cover can be selectively swung to press the heat insulation block against the sealing module, or to press the second replacement element of the press cover against the first replacement element of the seat.

16. The hand-held electric sealer with dual heads as claimed in claim 15, wherein the sealing module further includes two contacts, a spring, a heat insulation base, at least one heating wire, and a top cover, and the seat is provided with two insertion slots for receiving the two contacts, and the spring is interposed between the seat and the heat insulation base, the at least one heating wire straddles over the heat insulation base, and the top cover has an opening with the heat insulation base extending therethrough.

17. The hand-held electric sealer with dual heads as claimed in claim 15, wherein the sealing module further includes a heat resistant cover sheet and two locating plates, the heat resistant cover sheet is covered on the heat insulation base, and the two locating plates are provided for positioning the at least one heating wire.

18. The hand-held electric sealer with dual heads as claimed in claim 15, wherein the supporting casing is elastic materials.

19. The hand-held electric sealer with dual heads as claimed in claim 15, wherein the supporting casing is made by rigid materials.

20. The hand-held electric sealer with dual heads as claimed in claim 19, wherein the supporting casing further includes a connecting element interposed between the upper support and the lower support, wherein the upper support is provided with a pair of elastic sheets, and are located above the connecting element, and wherein the press cover is engaged with and above the upper support, and the seat is engaged with and underneath the lower support.

* * * * *